United States Patent [19]
Bertaud

[11] 3,892,306
[45] July 1, 1975

[54] CONVEYOR LUBRICATION LINE CONNECTION ARRANGEMENT

[75] Inventor: Francois X. Bertaud, Aurora, Ill.

[73] Assignee: Borg-Warner Corporation, Chicago, Ill.

[22] Filed: Mar. 30, 1972

[21] Appl. No.: 239,475

[52] U.S. Cl. .............................. 198/192 R; 308/20
[51] Int. Cl. ............................................ F16n 7/24
[58] Field of Search ................. 198/192 R; 308/20; 285/3–4, 343

[56] References Cited
UNITED STATES PATENTS

| | | | |
|---|---|---|---|
| 1,577,725 | 3/1926 | Jones | 198/192 R |
| 2,641,489 | 6/1953 | Hedberg | 285/3 |
| 3,139,293 | 6/1964 | Franck | 285/4 |
| 3,338,381 | 8/1967 | Imse | 198/192 R |

FOREIGN PATENTS OR APPLICATIONS

| | | | |
|---|---|---|---|
| 894,999 | 4/1962 | United Kingdom | 285/343 |
| 50,169 | 10/1966 | Germany | 285/343 |

Primary Examiner—Evon C. Blunk
Assistant Examiner—Robert Saifer
Attorney, Agent, or Firm—Arthur M. Streich

[57] ABSTRACT

In a roller conveyor system incorporating means to insure lubrication of all bearings, a flexible tube connection between the hollow roller idler shafts is provided. To insure the ability to lubricate the bearings under relatively high pressures, the flexible tube is connected with the shafts by using a compression fitting having a shear portion which becomes crimped or compressed onto the flexible tube during installation of the connection between roller idler shafts.

5 Claims, 4 Drawing Figures

CONVEYOR LUBRICATION LINE CONNECTION ARRANGEMENT

BACKGROUND OF THE INVENTION

Many conveyors have idlers or the like mounted on a hollow spindle or shaft assembly by anti-friction bearings of the roller or ball bearing varieties. The bearings are lubricated through the hollow spindle. The hollow spindle or shaft assembly is, for a troughlike, conveyor belt, a composite of several pieces. For example, where three idlers are used, there is a shaft or spindle for each idler. The shafts are connected for the passage of lubricant from one end to the other. Ideally, a flexible connection between adjacent shaft is desirable, making it relatively easy to assemble the units using preformed and fixed idler support frames.

Unfortunately, the connection between the adjacent shafts of idlers known on the prior art are not entirely satisfactory in that they are not capable of being used at the relatively high pressures required to properly lubricate the bearings or require manufacturing tolerances which materially increase the cost of manufacture of the assembly. Some require the frames to have removable parts for assembly, making the structure more expensive to manufacture.

The means for connecting two adjacent roller shafts of multiple roller belt conveyor idlers presently used in the industry fall under the following categories:

1. A snug to interference fit between a flexible tube and the roller shaft bore which relies entirely on the interference between the roller shaft bore and the flexible tubing. As the tubing is subjected to lubrication pressure, an unbalanced force due to the curvature of the tubing required to connect the inclined rollers, tends to pull the tubing out of the shafts. This action is only counteracted by the friction developed between the shaft bore and the outside diameter of the tubing. This phenomenum can occur at a relatively low pressure, on the order of 200 p.s.i. or lower. Of course, the tube material, the interference fit and surface finish of the parts, as well as the degree of flexibility of the tube, can be factors affecting the pressure limit. Less flexible tubes which will withstand higher pressures will necessarily cause more difficult assembly of the parts.

2. The roller supports are machined to receive directly the roller shafts and seal the mating surfaces with an O-ring. Such a connection permits the use of high pressures but requires machined removable idler supports to provide for the assembly of the rollers into the idler frame.

3. A deformable elastic grommet is inserted between the two roller shaft ends and is kept in a restricted enclosure formed by a special roller support configuration and cover. This structure requires tight manufacturing tolerances in the roller shafts lengths as well as in the support to support distance in the frame, so as to preload properly the connecting grommet. The allowable pressure on this type of connection is a direct function of the longitudinal preload of the grommet as well as of the hardness of the compound used for the grommet as generally a fairly large sealing area is under lubricant pressure.

4. A flanged plastic tube is inserted in each shaft end. The two flanges and exposed portions of the tubes are enclosed in a split housing fitting inside the rollers support. A threaded fastener maintains both halves of the housing tightly together. This arrangement does not offer a positive seal between the tubes and the roller shaft bores. It requires a multiplicity of parts to cover the various troughing angles common in the belt conveyor idler industry if no portion of the tubes is to remain exposed.

SUMMARY OF THE INVENTION

According to this invention, a flexible tube, capable of withstanding elevated pressures is used between adjacent idler shafts, the joint being by means of a shearable, compression fitting producing a mechanical joint. The compression fitting comprises a one piece nut and sleeve to receive the tube and having a threaded portion adjacent the nut. The sleeve shears off when the fitting is tightened in the shaft and becomes permanently attached to the tube. According to this invention each shaft is tapped in a counterbored portion adjacent its ends, such that the sleeve of the fitting engages the shoulder or seat of the counterbore and by friction is prevented from rotating. By continued tightening of the nut, at least a portion of the sheared sleeve is crimped to the tube. Such a joint will withstand high lubricant pressures limited only by the pressure limitations of the flexible tube. Thus, if the flexible tube is chosen to withstand pressure in the neighborhood of 2000 p.s.i., the joint will withstand correspondingly high pressures.

The assembly of idlers on assembly with an idler frame is greatly facilitated by using this invention. The idlers and their shafts can be assembled on the frame with the connection tubes in position. Before tightening the fitting nuts, the tube is free to move axially and because of its flexible nature, can be countoured to fit where necessary. Also, the tube will assume its ultimate contour. After assembly of the idlers on the idler frame, the nuts can be tightened and the joint between the shafts and the tubes is perfected, as described. The invention is not only effective but is economical as well.

Because of the ability of an assembly of idlers using this invention to be capable of use with relatively high lubrication pressures the invention is particularly useful in an assembly such as described and claimed in my copending U.S. application entitled Lubricating Method and Apparatus, Ser. No. 102,490. filed Dec. 29, 1970.

In my copending application, there is described and claimed a method and apparatus insuring the lubricating of each bearing in an idler assembly or spaced along a hollow shaft having at least one end supplied with a lubricating fitting. Specifically, the method comprises creating a pressure drop between the shaft and the bearing or bearing cavity which exceeds that between the ends of the shaft. The apparatus comprises, in one form, a tube in an opening communicating the interior of the shaft with the bearing or bearing cavity. To optimize the arrangement, the tubes are of different lengths which will insure uniform lubrication of each bearing along the shaft. Generally, in such systems, it is desirable to avoid leakage of the lubricant to locations outside the idlers and to use relatively high lubrication pressures.

THE DRAWINGS

DETAILED DESCRIPTION

Figure 1:
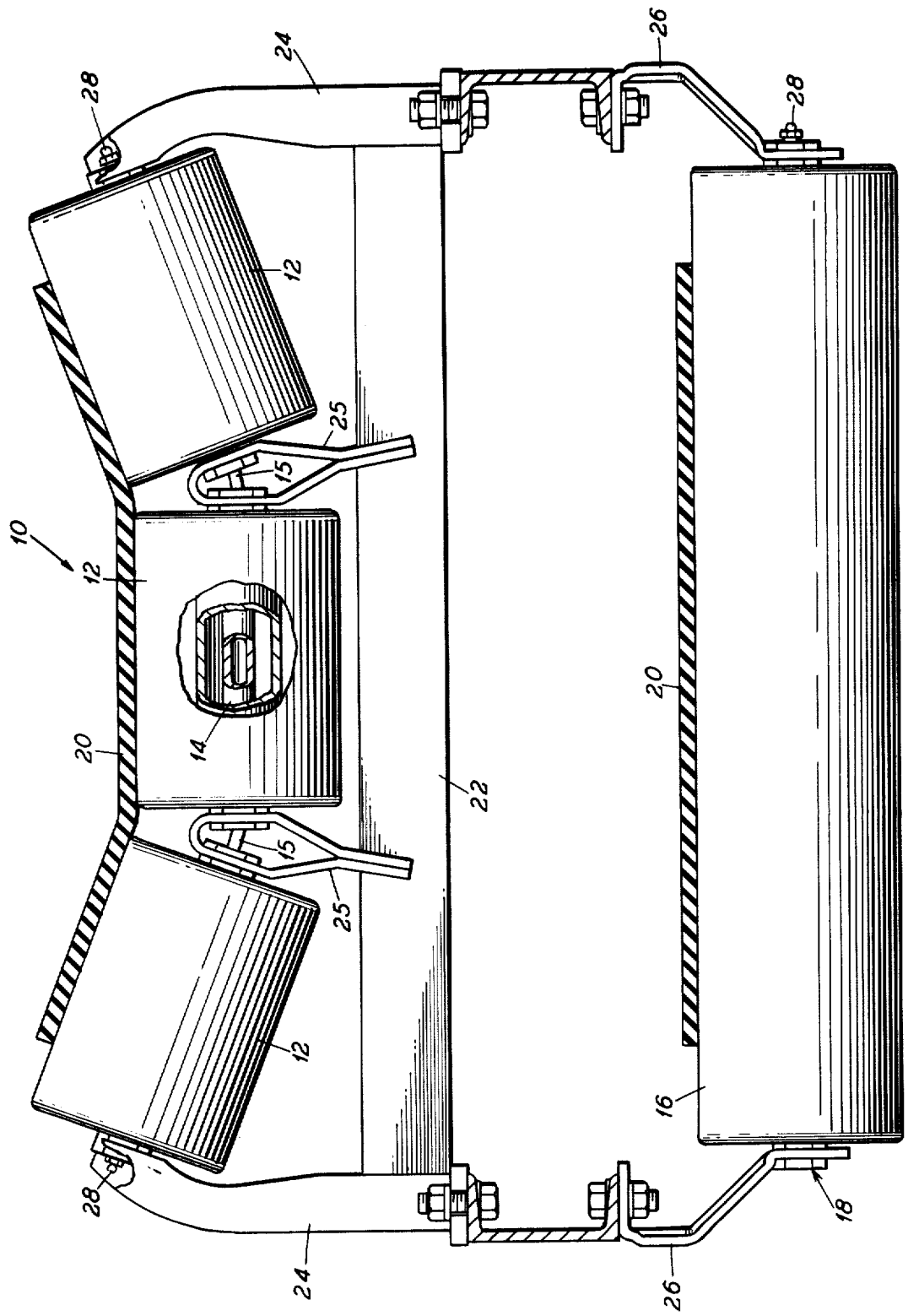
FIG. 1 is a side view of a typical multi-roller or idler assembly for a belt conveyor with parts broken away.

Looking at FIG. 1 of the drawings, there is illustrated a typical multi-roll idler assembly 10 for a belt conveyor which comprises three rollers or idlers 12, each mounted for rotation on a fixed tubular spindle assembly 14. The spindle assembly, as illustrated, is constructed of three tubular spindles or shafts 14 joined together by a flexible tube and fitting combination 15 illustrated specifically in FIGS. 2 and 3. The assembly 10, as illustrated, is troughed, i.e., the axes of the outermost rolls 12 are angled with respect to the axis of the center roll. The outer rolls could be conical if so desired. In the assembly illustrated, a return roll or idler 16 mounted on a hollow spindle or shaft 18 is positioned below the troughed idler assembly. The idlers 12 support the forward flight of a belt 20, while the roller 16 supports the return flight of the belt 20.

The idler assembly 10 is suitably supported by a base 22, end brackets 24 and intermediate brackets 25. Brackets 26 support the return idler 16.

Lubrication fittings 28 are provided at at least one end of the tubular spindle assembly 14 and at at least one end of the shaft 18. These fittings 28 are used to supply lubricant to the hollow spindles of shaft 14, and thus to the spaced bearings as will be described.

Figure 2:
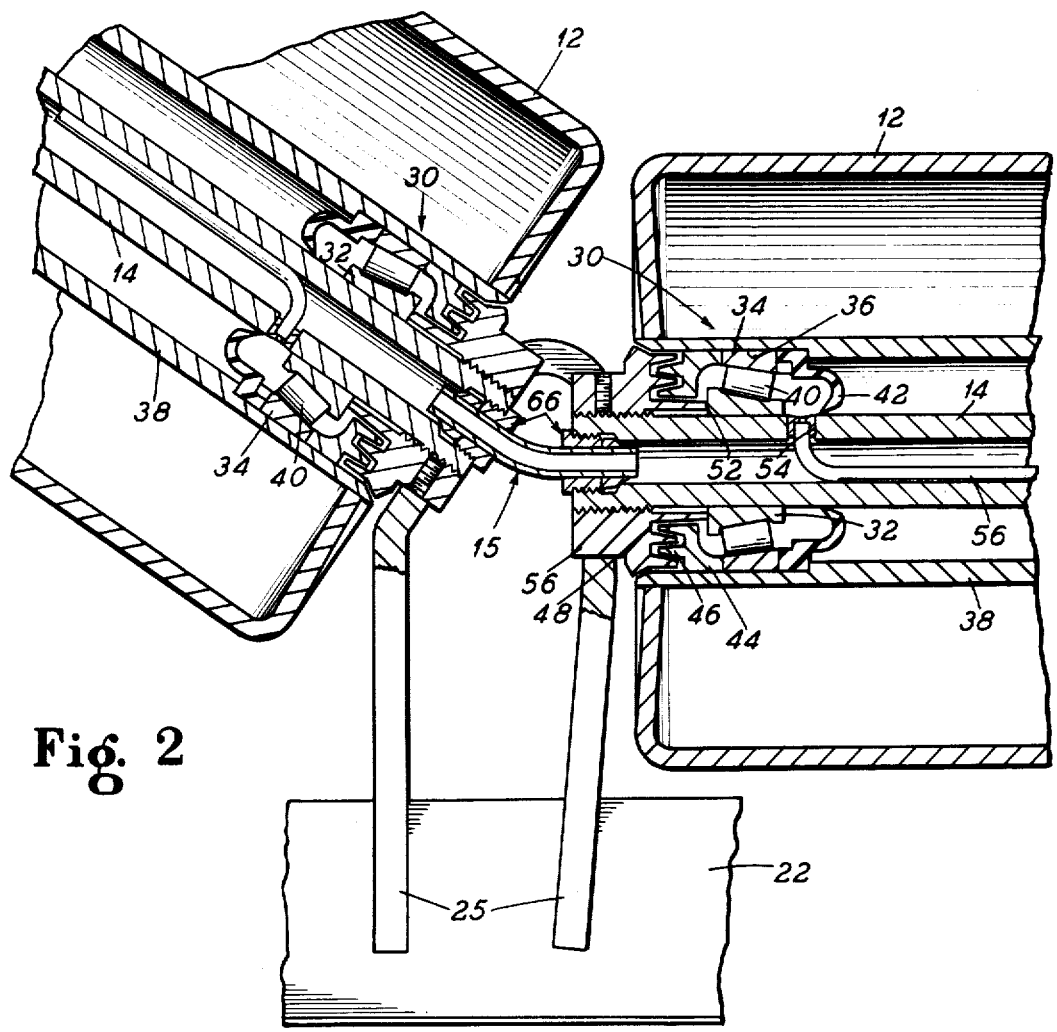
FIG. 2 is an enlarged partial sectional view of adjacent idler and bearing assemblies illustrating the connection between the hollow shafts according to this invention.
Figure 3:
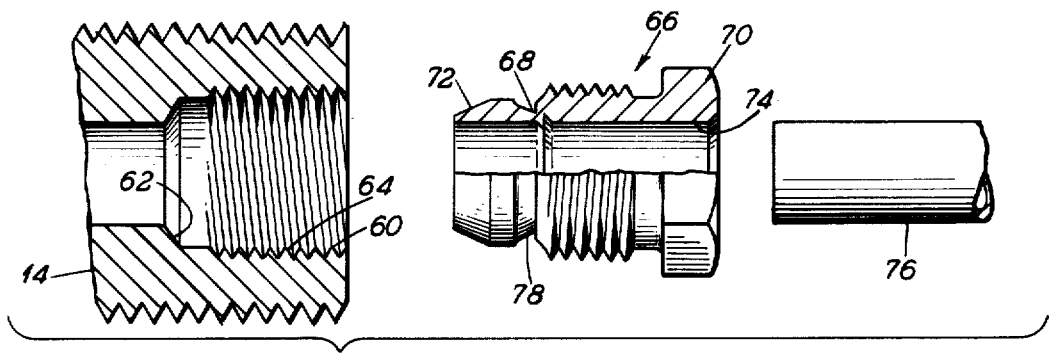
FIG. 3 is an exploded view of a flexible tube, a typical compression fitting, partially in section and the counterbored internally threaded shaft, according to this invention
Figure 4:
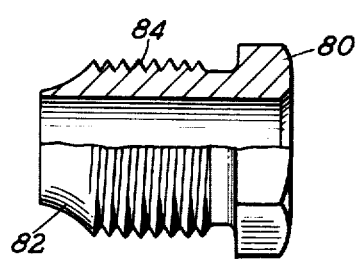
FIG. 4 is a partial sectional view of an alternative compression fitting.

Each roll or idler 12 is rotably mounted on the spindle by at least a pair of spaced anti-friction bearing means, generally identified as 30, see FIG. 2. Each anti-friction bearing 30, shown here for purposes of illustration as a roller bearing assembly, has an inner race 32, and an outer race 34 fixed or otherwise secured in a recess 36 in an inner tube 38 of the idler roll 12. Rollers 40 are disposed between the races 32 and 34. To seal the bearing 30 from foreign matter, there is provided a grease retainer or inner seal 42 which abuts the outer race 34, wipes the spindle 14, and is retained in the recess 36.

An outer seal 44 is also provided which comprises a circular member fixed to the inner tube 38, having a flange engaging the outer race 34 and a plurality of circular projections 46 complementary to circular grooves 48 in a fixed outer member 50 having threaded engagement with spindle 14. The member 50 has an inwardly directed flange 52 engaging the inner race 32.

To lubricate the bearings 30, a lubricant, such as grease, is forced through the spindle 14 by way of the fittings 28.

Openings 54 are provided in the spindle which communicate the interior of the spindle with the bearing 28 and its cavity. A tube 56 is sealed in each opening 54 and extends into the interior of the spindle 14. As set forth in my copending application, the length of each tube is chosen to provide the desired pressure drop between the spindle and bearing. With this structure, lubricant flows through the spindle 14, through the tubes 56, through the bearing cavity, and out through the spaces between the member 44 and the outer member 50, providing lubrication for the bearing, purging the bearing of contaminated lubricant, and insuring fresh and clean lubricant to the rollers 40.

Lubricant is supplied to the spindle 14 at relatively high pressure, so that the tube 15 must not only withstand this pressure but must be such that the assembly of idlers can be readily assembled.

To accomplish the objectives of this invention, each spindle part 14 is counterbored, as at 60 to provide a shoulder 62, and is internally threaded at 64 to receive a nut-sleeve fitting 66 having an intermediate shear section 68 between the threaded nut portion 70 and a sleeve section 72. The threads of the fitting mate with the threads of 64. The fitting has a bore 74 to receive a flexible tube 76 which is chosen to withstand the desired pressure. A high pressure nylon tube can be used.

When assemblying the units, the fittings 66 are screwed, by hand, into the spindles. The length of tube is then inserted in one of the rollers and the rollers are assembled to the frame. After the initial assembly of the rollers 12 on the frame, the tubes, previously placed in rollers are moved to engage both fittings, i.e., one at each end of the tube and the fittings are tightened.

The sleeve portion 72 frictionally abuts the shoulder or seat 62. Continued tightening of the nut portion 70 causes the sleeve 72 to shear at 68 and upsets the lip 78 to grip or be crimped to the tube 76. Thus the joint is perfected. The tube 76 is thus fixed into position; the sleeve 72 is sealed against the shoulders or seat 62.

An alternative fitting 80 may be used. The fitting 80 has a tapered end portion 82, a threaded nut portion 84, and an interior bore 86 to receive the tube 76. The structure is assembled in the same manner as above, after which the fitting is tightened so that the end portion 82 engages the shoulder or seat 62 of the spindle 14. The end portion 82 is crimped or swaged onto the tube 76 to perfect the joint.

While the second embodiment is not so desirable as the first embodiment with the shear section, it nevertheless will provide a good seal to withstand the elevated pressure of the lubricant.

I claim:

1. In an idler assembly for belt conveyors and the like having at least a pair of idlers in side-by-side relationship, each idler being rotably mounted on a hollow shaft by spaced bearing assemblies and having means communicating each bearing assembly with the interior of the shaft, each bearing assembly being lubricated by forcing lubricant through the shafts and through the communicating means into the bearing assemblies, the adjacent idler shafts being joined together, the improvement comprising:
   a unitary flexible tube joining the shafts together,
   a fitting engaging each end of the flexible tube and threadably received in the end of the hollow shaft,
   a seat at each end of the hollow shaft,
   each fitting having a portion which during assembly of the shaft and the flexible tube is crimped into sealing engagement with the flexible tube by being forced against the seat.

2. An idler assembly as recited in claim 1 wherein each fitting has a shear section which becomes detached during assembly of the idlers, said shear section being the portion of the fitting which is crimped into sealing engagement with flexible tube.

3. In an idler assembly for belt conveyors and the like having at least a pair of idlers in side-by-side relationship, each idler being rotably mounted on a hollow shaft by spaced bearing means and having means communicating each bearing means with the interior of the shaft, each bearing means being lubricated by forcing lubricant through the shafts and through the communicating means into the bearing means, the adjacent idler shafts being joined together, the improvement comprising:

a unitary flexible tube between the shafts, a compression fitting on each end portion of the flexible tube and connected to the adjacent shaft, said fitting having a portion crimped onto the flexible tube and in abutting sealing engagement with a portion of the hollow spindle.

4. An idler assembly as recited in claim 3 in which each said fitting is threadably received in the hollow shaft and said crimped portion abuts a seat in said shaft.

5. An idler assembly as recited in claim 4 wherein each said crimped portions are sheared from the remainder of the fittings.

* * * * *